Oct. 2, 1962 J. R. OISHEI ET AL 3,056,160
WINDSHIELD WIPER
Filed May 14, 1959
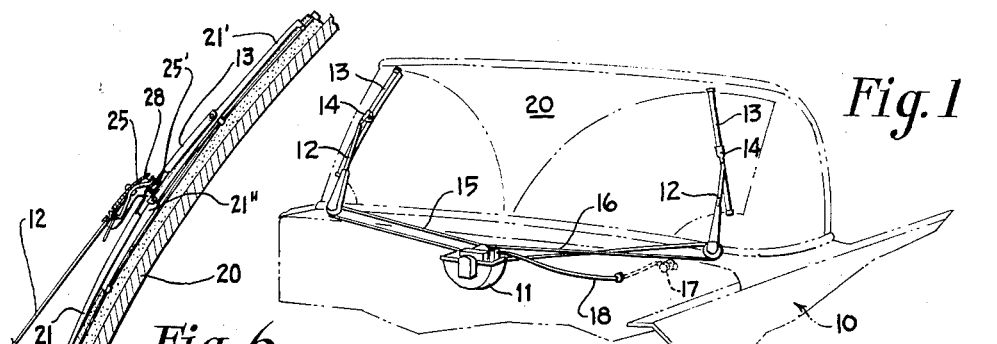
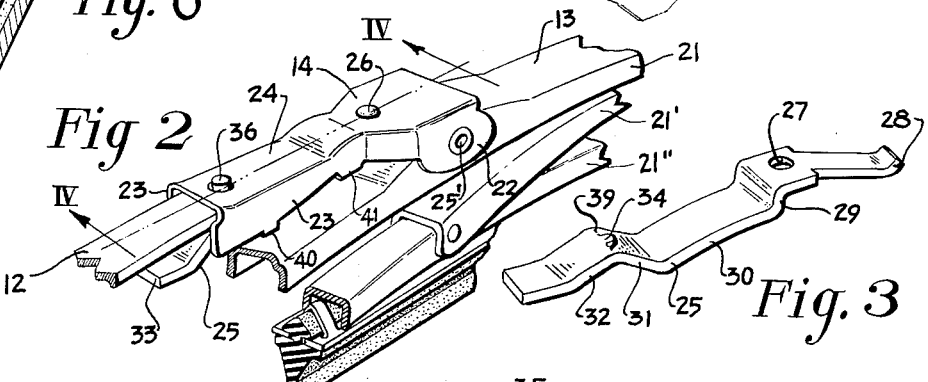
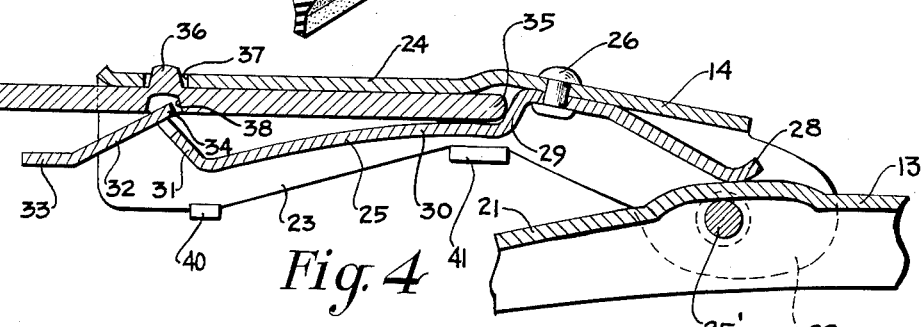
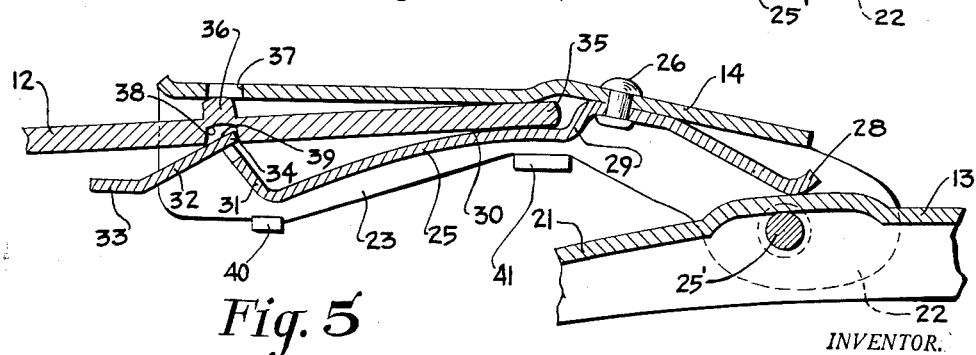
INVENTOR.
JOHN R. OISHEI and
BY ANTHONY C. SCINTA
Bean Brooks Buckley + Bean.
ATTORNEYS

United States Patent Office 3,056,160
Patented Oct. 2, 1962

3,056,160
WINDSHIELD WIPER
John R. Oishei, Buffalo, and Anthony C. Scinta, Hamburg, N.Y., assignors to Trico Products Corporation, Buffalo, N.Y.
Filed May 14, 1959, Ser. No. 813,280
9 Claims. (Cl. 15—250.32)

The present invention relates to a windshield wiper blade construction and more particularly to an improved attaching clip therefor.

It is one object of the present invention to provide an improved attaching clip which produces a dual latching action to positively prevent a wiper blade from being accidentally disconnected from a wiper arm.

It is another object of the present invention to provide an improved attaching clip which not only positively prevents a wiper blade being accidentally disconnected from a wiper arm but also provides an incremental amount of resilient pressure for both maintaining the wiping blade in optimum wiping contact with a curved windshield and for preventing rattling of the blade.

A still further object of the present invention is to provide an improved wiper blade attaching clip, the improved clip permitting the joining of a wiper blade and a wiper arm by a simple relative sliding motion while permitting their separation only when opposing forces are applied to the clip, it being practically impossible to apply such forces accidentally. Other objects and attendant advantages of the present invention will readily be perceived hereafter.

In accordance with the present invention, a dual latching arrangement is provided for preventing inadvertent separation between a wiper arm and a clip secured to the wiper blade. The wiper clip consists of a substantially rectangular housing having a spring member as its lower wall. The wiper arm is adapted to be slid into the housing in such a manner that the spring bears on the bottom side thereof to cause the top side thereof to bear against the top wall of the housing. The first latching arrangement consists of a cooperating protuberance and aperture between the upper side of the arm and the top wall of the housing. When the wiper arm and the clip are in assembled position, the spring will bias the first latching arrangement into locking engagement to prevent withdrawal of the wiper arm from the housing. The second latching arrangement consists of a cooperating protuberance and aperture extending between the spring member and the bottom of the wiper arm. In the assembled position of the clip and arm, the second latching arrangement is also in a locked relationship. Therefore, if the wiper arm should move away from the top surface of the housing a sufficient distance to permit disengagement of the first latching arrangement, the second latching arrangement will become even more firmly engaged because of the greater biasing force exerted thereon by the spring. The above-described arm and blade cannot be separated unless opposing forces are applied to the main portion of the housing and to the spring therein, this situation being practically impossible of being experienced by accident. Accordingly, the improved clip structure of the present invention provides an arrangement wherein a wiper blade and arm may be assembled by a simple relative sliding motion but separation thereof may not be effected inadvertently because it is practically impossible to apply the above-mentioned opposing forces by accident.

Further, in acordance with the present invention, the above-described spring within the clip housing serves the additional function of providing a biasing force between the clip housing and the superstructure of the wiper blade. This biasing force is transmitted through the superstructure of the blade to provide an incremental amount of pressure between the upper portion of the blade and the windshield. This incremental amount of pressure is particularly desirable because it enhances firm wiping contact of the wiper blade with the receding lateral portions of a curved windshield. Furthermore, the positioning of the spring between the clip housing and the superstructure of the blade resiliently takes up any play therebetween which may occur incidental to long wear. The present invention will be more fully understood when the following portions of the specification are read in conjunction with the accompanying drawing, wherein:

FIG. 1 is a fragmentary perpsective view of an automotive vehicle mounting a windshield wiper system;

FIG. 2 is an enlarged fragmentary perspective view of a wiper blade having a retaining clip secured thereto and mounted on a wiper arm;

FIG. 3 is a perspective view of the retaining spring which is mounted within the retaining clip;

FIG. 4 is an enlarged view taken along line IV—IV of FIG. 2 showing the wiper arm in its normal locked position within the retaining clip;

FIG. 5 is an enlarged view similar to FIG. 4, but showing the position which the wiper arm assumes relative to the retaining clip when an accidental manipulation tends to separate these elements; and FIG. 6 is a schematic view showing how the spring within the retaining clip provides an incremental amount of pressure to the wiper blade.

Reference is now made to FIG. 1 where an automotive vehicle 10 is shown having a wiper motor 11 mounted thereon in any conventional manner. Wiper arms 12, which mount wiper blades 13 by clips 14, are suitably mounted on rockshafts (not shown) journaled in the cowl of the vehicle. When motor 11 is placed in operation by the actuation of control 17 which is coupled thereto by Bowden cable 18, flexible cables 15 and 16 transmit motion produced by motor 11 to the rockshafts to thereby cause oscillation of wiper blades 13 across curved windshield 20, as is well known in the art. Wiper arms 12 may be of the type which have spring means for biasing them toward a windshield, as depicted in Patent No. 2,807,822.

In order to secure wiper blade 13 to arm 12, a clip 14 is mounted on lever 21 of the wiper blade. Clip 14 is essentially an elongated three-sided housing being substantially open on the under side thereof and at its two ends. One end of the housing has depending ear portions 22 extending from side portions 23 which, in turn, extend from top portion 24. A rivet 25' extends through aligned apertures (not shown) in ears 22 and lever 21 for pivotally securing clip 14 on lever 21.

A retaining spring 25 is secured to top portion 24 of clip 14 by rivet 26 which extends through aperture 27 (FIG. 3) in spring 25 and a suitable aperture (not numbered) in clip 14. As can be seen from FIGS. 4 and 6, the end portion 28 of spring 25 exerts a pressure on lever 21 to the right of rivet 25' to provide an incremental amount of pressure for maintaining the upper portion of the wiper blade in firm engagement with the windshield. This additional pressure is particularly desirable when a wiper blade is in its outboard position on the receding side portion of a curved windshield. While the wiper blade shown in FIG. 6 includes a plurality of levers 21 and 21' and yoke 21" pivoted to each other at spaced points (not numbered), it will be appreciated that other types of blades may also be used.

As can be seen from FIGS. 3, 4, and 5, the portion of spring 25 to the left of aperture 27 consists of a depending portion 29 which causes elongated portion 30 to be sufficiently spaced from the under side of upper clip portion 24 to permit wiper arm 12 to be conveniently located therebetween. However the part of elongated portion 30 which is adjacent to part 29 is extremely close to the undersurface of the end 35 of arm 12 to lend stability to the assembly. The only clearance between these portions is that required to permit easy assembly and disassembly of the arm and clip. At the left side of elongated spring portion 30, an inverted V-shaped portion consisting of legs 31 and 32 is located. The spring 25 terminates in a tab portion 33 which is affixed to leg 32 and which extends outside of clip 14. Substantially at the apex 39 of legs 31 and 32, a protuberance 34 is formed as by punching.

In order to place wiper blade 13 in assembled relationship on arm 12, it is merely necessary to place the end 35 of arm 12 between upper portion 24 of clip 14 and leg 32 of spring 25 and slip the clip 14 onto the arm. Punched in arm 12 is an upstanding protuberance 36 which is adapted to be received in aperture 37 in clip 14 when the latter has been moved a sufficient distance onto arm 12. Elements 36 and 37 comprise a first latching arrangement. It will also be noted that when protuberance 36 is formed on the upper side of arm 12, an aperture 38 is inherently formed in the lower part of arm 12. When protuberance 36 is in engagement with aperture 37, protuberance 34 fits within aperture 38 while the apex 39 bears against the portions of arm 12 to either side of aperture 38. Elements 34 and 38 comprise a second latching arrangement. Clip 14 is securely retained on arm 12 because both apex 39 and the portion of spring section 30 adjacent portion 29 engage the lower side of arm 12.

In the event that the left side of arm 12 (FIGS. 2, 4, and 5) should be moved downwardly relative to clip 14 so that protuberance 36 loses engagement with aperture 37 (see FIG. 5), protuberance 34 will still remain within aperture 38 thereby preventing arm 12 from being totally separated from clip 14.

If it is desired to remove the wiper blade 13 from arm 12, it is merely necessary to move arm 12 downwardly relative to clip 14 and then pull the arm a bit to the left to the position shown in FIG. 5 wherein protuberance 34 engages the side of aperture 38 but protuberance 36 is withdrawn from aperture 37. Thereafter, it is only necessary to depress tab 33 to remove protuberance 34 from aperture 38 and then slide the clip 14 off of arm 12.

When wiper arm 12 is again reinserted in the housing of clip 14, depending portion 29 will act as an abutment for the end 35 of the arm. In this manner, inward movement of arm 12 will be positively limited to avoid the possibility of protuberance 36 travelling beyond aperture 37.

The protuberance 36 and the aperture 37 constitute interlocking shoulders. Likewise, the protuberance 34 and the aperture 38 constitute interlocking shoulders. The spring 25 is therefore common to both pairs of interlocked shoulders and serves as resilient means for detachably holding them operative but readily permits the connector housing to be demounted in effecting its replacement.

It is to be further noted that pairs of tabs 40 and 41 are fabricated from side portions 23. Each tab extends about one-third of the distance across the width of the clip toward the center line of the clip. These tabs serve to define the limit of downward movement of spring 25 to prevent excessive stressing thereof during insertion and removal of wiper arm 12.

It can thus be seen that an improved retaining clip structure has been provided for securing a wiper blade to a wiper arm. This improved structure positively prevents the wiper blade from being inadvertently removed from the wiper arm as may occur during the lifting of the wiper blades during a windshield cleaning operation or as may occur when snow or ice is packed between the retaining clip and the yoke of the wiper blade.

While a preferred embodiment of the present invention has been disclosed, it is to be understood that the present invention is not limited thereto, but may be otherwise embodied within the scope of the following claims.

What is claimed is:

1. A double latching arrangement for preventing accidental separation of a wiper blade from a wiper arm comprising a housing for receiving the end portion of a wiper arm therein, first latching means operatively interconnecting said wiper blade and one side of said wiper arm, second latching means operatively interconnecting said wiper blade and opposite side of said arm, and spring means for biasing said first and second latching means to latching positions whereby a force in a direction which would cause accidental disengagement of said first latching means tends to increase the bias produced by said spring means on said second latching means and is therefore ineffective for causing disengagement of said second latching means, whereby accidental separation of said wiper blade from said wiper arm is prevented.

2. A retaining structure for preventing a wiper blade from being inadvertently removed from a wiper arm comprising a housing on said wiper blade for receiving the end portion of said wiper arm therein, a retaining spring secured within said housing, and interengaging means operatively associated with said housing, wiper arm, and retaining spring, said interengaging means including first latch means between one side of said arm and said housing, and second latch means between the opposite side of said arm and said retaining spring, said second latch means preventing inadvertent separation of said arm from said housing in the event of the unlatching of said first latch means by relative movement between said housing and arm against the bias of said spring.

3. A retaining structure for maintaining a wiper blade in engagement with a wiper arm comprising a housing attached to said blade for receiving the end portion of said wiper arm therein, retaining spring means mounted in said housing for resiliently biasing said arm into engagement with a portion of said housing, a first protuberance and aperture connection between said arm and said housing, a second protuberance and aperture connection between said spring and said arm, said second connection being adapted to maintain said arm in engagement with said spring when said first connection is separated against the bias of said spring to thereby prevent said blade from being inadvertently removed from said arm.

4. A retaining structure for preventing a wiper blade from being inadvertently removed from a wiper arm comprising a housing on said blade for receiving the end portion of said wiper arm therein, first connecting means operatively interposed between said housing and said arm, spring means for biasing said first connecting means into latching relationship, second connecting means operatively interposed between said spring means and said arm, said second connecting means being so oriented relative to said first connecting means so as to remain in latching engagement when said first connecting means are disengaged against the bias of said spring means.

5. A combination securing and pressure modifying arrangement for a wiper blade comprising a superstructure, a wiping element operatively secured to said superstructure, a housing pivotally mounted on said superstructure, a wiper arm, said housing receiving the end of said wiper arm therein, locking means associated with said arm and housing, a spring mounted on said housing, a first portion of said spring biasing said locking means to a locking position, and a second portion of said spring bearing against said superstructure for biasing said superstructure toward an associated windshield for assisting in maintaining said wiper in firm wiping contact with a windshield associated therewith.

6. A construction for securing a wiper blade to a wiper arm comprising a housing affixed to said blade, said housing receiving the end portion of said arm therein, a protuberance on said arm, a first aperture in said housing adapted to receive said protuberance, spring means affixed to said housing, said spring means adapted to force said protuberance into said aperture, a second aperture in said arm, and a protuberance on said spring means adapted to be received in said aperture in said arm, said protuberance on said spring means in said aperture in said arm preventing said arm from being withdrawn from said housing in the event said protuberance on said arm is withdrawn from said first aperture in said housing against the bias of said spring means.

7. A connector for mounting a windshield wiper element on a wiper arm element, comprising an arm receiving housing having an internal shoulder interlocking with a shoulder on the arm, resilient means carried by the housing in opposition to the internal shoulder and yieldable therefrom to permit one shoulder from being disengaged from the other, said resilient means and said arm also having interlocking shoulders, and said resilient means being common to both pairs of shoulders and cooperatively holding them interlocked for mounting and demounting the wiper on and from the arm.

8. A retaining structure for maintaining a wiper blade assembly in engagement with a wiper arm comprising an elongated housing pivotally mounted on said blade assembly, said housing including a top wall and side walls depending therefrom, spring means mounted in said housing in opposition to said top wall, said housing receiving the end portion of said wiper arm, said end portion of said wiper arm lying between said spring means and said top wall and also being confined against lateral movement relative to said housing by said side walls, a first latch connection between said housing and said arm, a second latch connection between said spring means and said arm, said first latch connection relieving the loading on said second latch connection in the direction of relative movement between said arm and said housing, said second latch connection being adapted to retain said arm in engagement with said spring means when said first latch connection is disengaged against the bias of said spring means whereby said second latch connection prevents said end of said arm from being inadvertently withdrawn from said housing in the event of inadvertent disengagement of said first latch connection.

9. A windshield wiper clip comprising a housing having a top wall and side walls depending therefrom, spring means mounted in said housing in opposition to said top wall, means associated with said top wall for providing a first latching relationship with one side of a wiper arm, and means associated with said spring for providing a second latching relationship with the opposite side of said wiper arm.

References Cited in the file of this patent

UNITED STATES PATENTS

| | | |
|---|---|---|
| 1,223,574 | Fedczyszyn | Apr. 24, 1917 |
| 2,149,550 | Richards et al. | Mar. 7, 1939 |
| 2,751,620 | Ehrlich | June 26, 1956 |
| 2,782,448 | Anderson | Feb. 26, 1957 |
| 2,798,244 | Nesson | July 9, 1957 |
| 2,807,822 | Scinta | Oct. 1, 1957 |
| 2,861,290 | Hoyler | Nov. 25, 1958 |
| 2,915,770 | Scinta | Dec. 8, 1959 |

FOREIGN PATENTS

| | | |
|---|---|---|
| 626,016 | Great Britain | July 7, 1949 |
| 1,023,025 | France | Dec. 24, 1952 |